(12) United States Patent
Kim et al.

(10) Patent No.: US 8,130,774 B2
(45) Date of Patent: Mar. 6, 2012

(54) OBJECT TRACKING METHOD AND SYSTEM

(75) Inventors: Geon Woo Kim, Daejeon (KR); Jong-Wook Han, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 333 days.

(21) Appl. No.: 12/433,522

(22) Filed: Apr. 30, 2009

(65) Prior Publication Data

US 2010/0021006 A1    Jan. 28, 2010

(30) Foreign Application Priority Data

Jul. 22, 2008    (KR) ........................ 10-2008-0071250

(51) Int. Cl.
*H04L 12/28* (2006.01)
*H04L 12/56* (2006.01)

(52) U.S. Cl. ....................................................... 370/401
(58) Field of Classification Search .................. 370/401, 370/331, 373, 377, 384, 328
See application file for complete search history.

(56) References Cited

U.S. PATENT DOCUMENTS 7,436,887 B2 * 10/2008 Yeredor et al. ........... 375/240.01
(Continued)

FOREIGN PATENT DOCUMENTS

KR    10-2007-0078451    8/2007

*Primary Examiner* — Ayaz Sheikh
*Assistant Examiner* — Blanche Wong
(74) *Attorney, Agent, or Firm* — Blakely, Sokoloff, Taylor & Zafman

(57) ABSTRACT

An object tracking method uses a system having an object identifying device and at least one video tracking device, wherein the object identifying device monitors an area to identify an object entering the area and the video tracking device wired/wirelessly connected to the object identifying device monitors the area monitored by the object identifying device. The method includes: extracting, at the object identifying device, object identification information of the object; providing, at the object identifying device, the object identification information to the video tracking device; tracking, at the video tracking device, the object to extract physical information of the object; mapping, at the video tracking device, the physical information to the object identification information to generate object information of the object; and storing, at the video tracking device, the object information in a memory of the video tracking device.

18 Claims, 2 Drawing Sheets

U.S. PATENT DOCUMENTS

| | | | |
|---|---|---|---|
| 7,792,333 B2* | 9/2010 | Aradhye et al. | 382/115 |
| 2002/0149467 A1* | 10/2002 | Calvesio et al. | 340/5.52 |
| 2002/0196330 A1* | 12/2002 | Park et al. | 348/49 |
| 2004/0161133 A1* | 8/2004 | Elazar et al. | 382/115 |
| 2005/0225444 A1* | 10/2005 | Clift et al. | 340/539.13 |
| 2007/0094720 A1* | 4/2007 | Galambos | 726/9 |

* cited by examiner

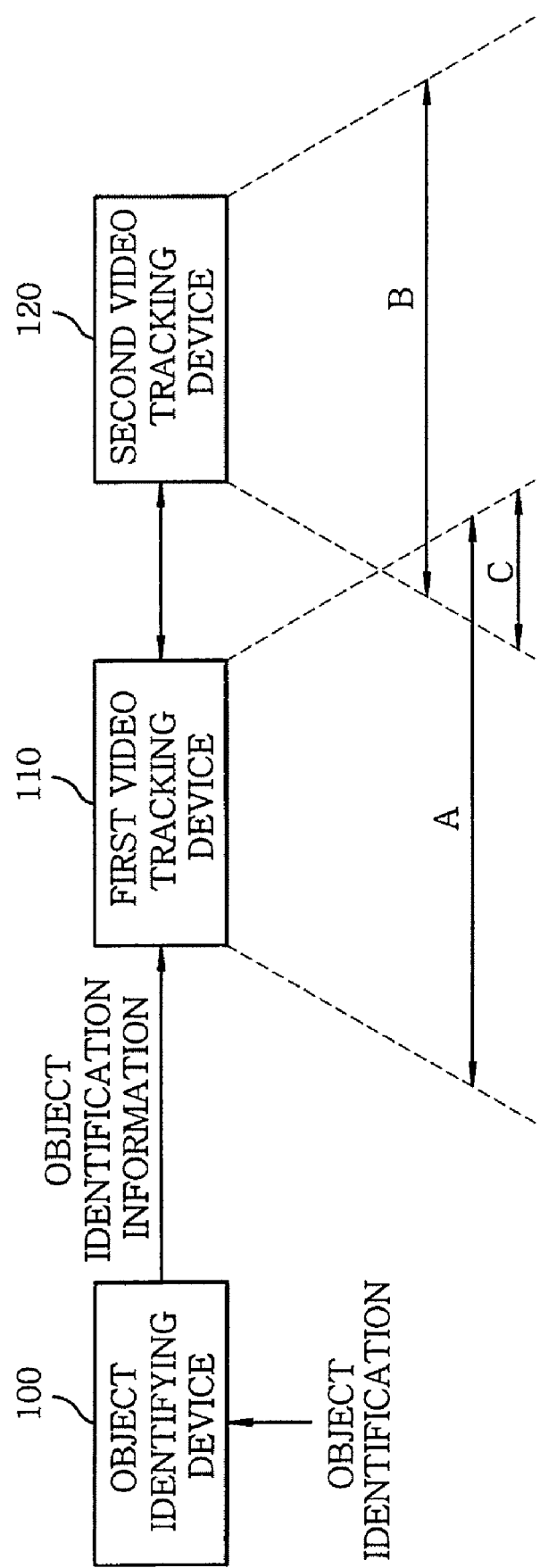

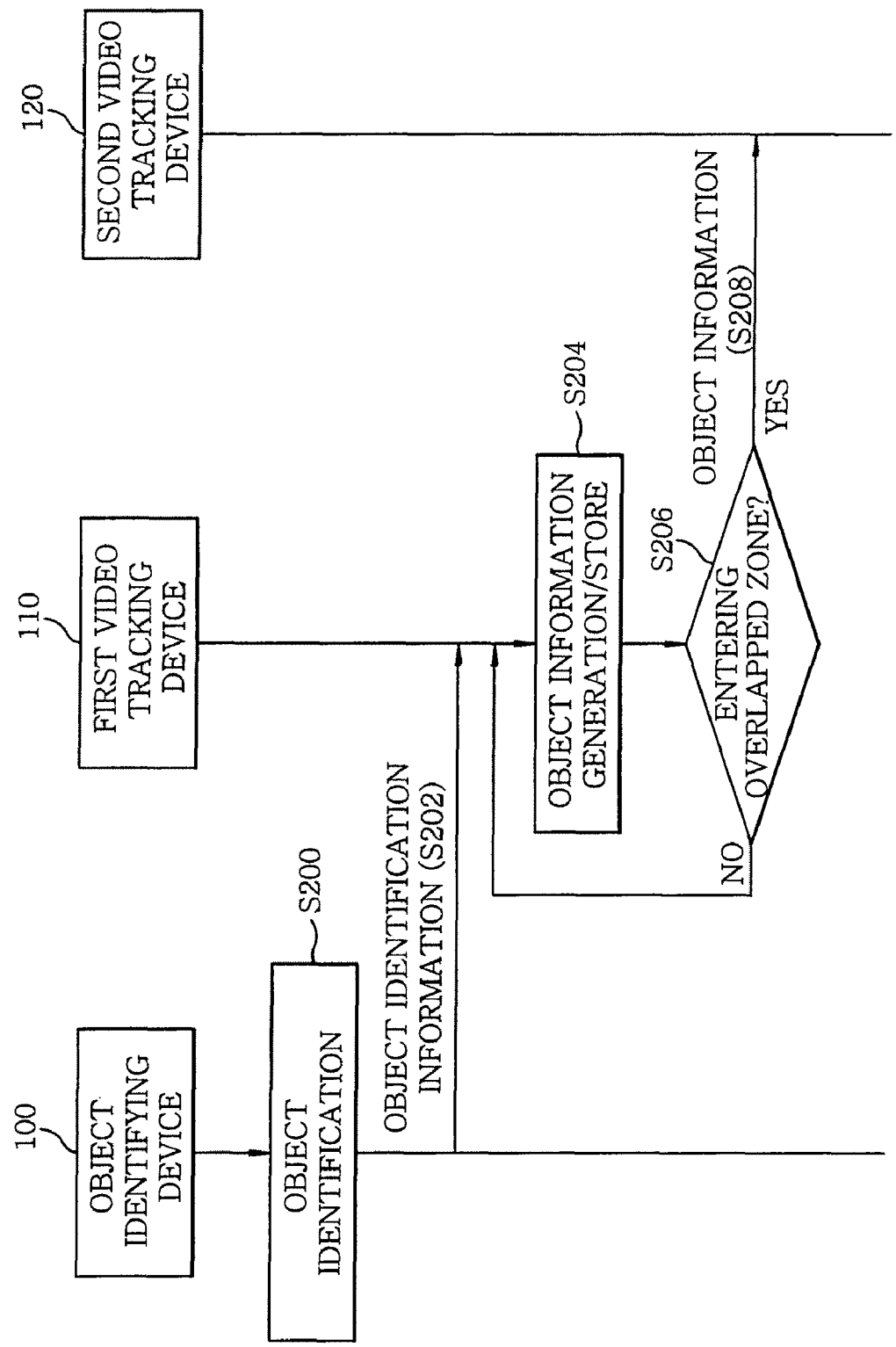

OBJECT TRACKING METHOD AND SYSTEM

CROSS-REFERENCE(S) TO RELATED APPLICATION(S)

The present invention claims priority of Korean Patent Application No. 10-2008-0071250, filed on Jul. 22, 2008, which is incorporated herein by reference.

FIELD OF THE INVENTION

The present invention relates to object tracking; and, more particularly, to a method and system for tracking a moving object using video tracking devices that operates in conjunction with an object identifying device.

BACKGROUND OF THE INVENTION

A surveillance system for detecting the occurrence of a particular action or event has been regarded as the most crucial part in the research field based on person tracking. This is because, as the society gets more developed and more complicated, safety for individuals and facilities is becoming very important not only in public places but also in private places. Especially, as the modern society gets to be more information-oriented, unmanned, automated and computerized, warning levels on problems with the safety concerning people and businesses as well as problems with the safety and security concerning properties have risen. To address these problems, a lot of efforts have been made to protect and manage individuals and business properties. Moreover, the importance and application range of security is now growing, e.g., from major facilities and government and public offices to schools, companies, homes and the like, and thus, the importance of a surveillance system and the need for developing such system have been recognized.

Such surveillance systems are categorized into: an video surveillance system which uses a CCTV (Closed-Circuit Television) camera or a PC (Personal Computer) camera; a network surveillance system which utilizes a network camera to transmit images to a computer at a high speed to allow a user to easily monitor them on his or her mobile phone, PDA (Personal Digital Assistant) or PC; and an IR (Infrared) surveillance system which is more useful at night time. Among them, the video surveillance system using a CCTV camera or a PC camera has been known as the most effective surveillance means, because, unlike other surveillance systems serving as a countermeasure, it can actively identify an intruder after the incidence of intrusion or destruction, can locate intrusion or an illegal act in advance and can record and store important information for later use.

The video surveillance system using a CCTV camera or a PC camera can not only identify an object, e.g., a person, as described above, but also can track a movement or path of the object.

A general object tracking system using a CCTV tracks an object within a single CCTV area, and also, tracks an object moving to another CCTV area based on visual characteristics or location information of the object. For example, if a person moves from a CCTV area to another CCTV area, the former CCTV transfers object-related information, e.g., the height, hair color, clothing, moving direction, velocity of the person and the like, to the latter CCTV, thereby tracking the person continuously.

However, one shortcoming of the conventional object tracking system using a CCTV is that it cannot uniquely identify an object.

SUMMARY OF THE INVENTION

In view of the above, the present invention provides an object tracking method and system, in which unique identification information of an object is used in tracking the object via cooperation between an object identifying device and CCTVs, thereby tracking the object efficiently.

In accordance with an aspect of the present invention, there is provided an object tracking method using a system having an object identifying device and at least one video tracking device, wherein the object identifying device monitors an area to identify an object entering the area and the video tracking device wired/wirelessly connected to the object identifying device monitors the area monitored by the object identifying device, the method including:

extracting, at the object identifying device, object identification information of the object;

providing, at the object identifying device, the object identification information to the video tracking device;

tracking, at the video tracking device, the object to extract physical information of the object;

mapping, at the video tracking device, the physical information to the object identification information to generate object information of the object; and storing, at the video tracking device, the object information in a memory of the video tracking device.

In accordance with another aspect of the present invention, there is provided an object tracking system, including:

an object identifying device for identifying an object entering an area monitored by the object identifying device to extract object identification information of the object; and at least one video tracking device wired/wirelessly connected to the object identifying device for monitoring the area monitored by the object identifying device, wherein the object identifying device provides the object identification information to the video tracking device; and wherein the video tracking device maps the physical information to the object identification information to generate object information of the object and stores the object information in a memory thereof.

According to the present invention, an object is identified and movements thereof is tracked via cooperation between an object identifying device for generating identification information of the object and video tracking devices, thereby not only providing a wide variety of object-oriented services, but also protecting the object from many risks.

BRIEF DESCRIPTION OF THE DRAWINGS

The above and other objects and features of the present invention will become apparent from the following description of an embodiment, given in conjunction with the accompanying drawings, in which:

FIG. 1 illustrates a block diagram of an object tracking system in accordance with an embodiment of the present invention; and FIG. 2 illustrates a flowchart of an object tracking method in accordance with the embodiment of the present invention.

DETAILED DESCRIPTION OF THE EMBODIMENT

Hereinafter, an embodiment of the present invention will be described in detail with reference to the accompanying drawings.

FIG. 1 illustrates a block diagram of an object tracking system in accordance with an embodiment of the present invention. The system includes an object identifying device 100 and first and second video tracking devices 110 and 120.

The object identifying device 100 detects approach of an object thereto and identifies the object by using an identification mechanism to extract object identification information of the object. Herein, the term "object" includes all kinds of objects capable of moving or being moved, e.g., a person, automobile, baggage, animal and the like.

The identification mechanism includes, e.g., receiving a certificate or identification/password from the object, reading data from an RFID (Radio-Frequency Identification) tag or a smart card attached to the object, detecting bio-signals of the object and the like.

That is, object identification information of an object extracted by the object identifying device 100 may be a certificate or identification/password inputted by the object, data read from an RFID tag or a smart card, bio-signals, or the like. The object identification information may also be information onto which service area information is mapped.

The object identifying device 100 provides thus extracted object identification information to the first video tracking device 110 connected thereto.

As shown in FIG. 1, the first and second video tracking devices 110 and 120 respectively have surveillance zones A and B having therein an overlapped zone C. The overlapped zone C is an area recorded simultaneously by both of the first and second video tracking devices 110 and 120.

The first video tracking device 110, e.g., a CCTV, is wired/wirelessly connected to the object identifying device 100 to receive the object identification information therefrom, and, extracts the object from a recorded image of the surveillance zone A to track the object. Here, the object identifying device 100 monitors the surveillance zone A monitored by the first video tracking device 110 to identify an object entering the surveillance zone A, and the object identification information extracted by the object identifying device 100 serves as a unique identification of the object.

Moreover, the first video tracking device 110 also extracts physical information of the object and maps the physical information to the object identification information to generate object information. The physical information includes combination of visual information, e.g, color, size, appearance and the like, and movement information, e.g., location, moving direction, velocity and the like, of the object.

The first video tracking device 110 stores thus generated object information in a memory (not shown), and provides the object information stored in the memory to the second video tracking device 120 when the object moves to the surveillance zone B monitored by the second video tracking device 120.

The second video tracking device 120 stores the object information received from the first video tracking device 110 in a memory (not shown), and based thereon, tracks the movement of the object. As the first video tracking device 110 does, the second video tracking device 120 also determines whether the object moves to an area monitored by another video tracking device (not shown), and if so, provides the object information stored in the memory to that video tracking device.

The first and the second video tracking devices 110 and 120 are interconnected via a wired/wireless communications interface, so that they provide the object information to each other via the wired/wireless communications interface.

Below, two examples for provision of the object information between the video tracking devices 110 and 120 will be described in detail.

First Example

The first video tracking device 110 may determine whether the object moves into the overlapped zone C to provide the object information to the second video tracking device 120. If it is determined that the object moves into the overlapped zone C, the first video tracking device 110 provides the object information to the second video tracking device 120.

Second Example

The first video tracking device 110 may provide the object information in response to a request from the second video tracking device 120. To be specific, the second video tracking device 120 determines, when the object moves into the surveillance zone B, whether the object identification information of the object exists in the memory, and based thereon, broadcasts a request signal for the object information to at least one video tracking device, e.g., the first video tracking device 110, connected to the second video tracking device 120. Here, the request signal contains the physical information of the object. In response to the request, the first video tracking device 110 provides to the second video tracking device 120 the requested object information corresponding to the physical information contained in the request signal. Then, the second video tracking device 120 stores the object information received from the first video tracking device 110 in the memory.

Now, object tracking procedures in the system having the above-described configuration will be described with reference to FIG. 2.

FIG. 2 illustrates a flowchart of an object tracking method in accordance with the embodiment of the present invention.

First, the object identifying device 100 identifies an object that enters the surveillance zone A (step S200). That is, the object identifying device 100 receives a certificate or an identification/password from the object, reads data from an RFID tag or a smart card attached to the object, detects bio-signals of the object, or the like. The object identifying device 100 then generates unique object identification information based on the identification result in the step S200, and provides the object identification information to the first video tracking device 110 that monitors the surveillance zone A (step S202).

The first video tracking device 110 receives the object identification information from the object identifying device 100 and tracks the object to extract physical information of the object. The first video tracking device 110 then maps the physical information to the object identification information to generate object information and stores thus generated object information in a memory (step S204).

Next, the first video tracking device 110 determines whether the object moves into the overlapped zone C (step S206).

If it is determined, in the step 206, that the object has moved into the overlapped zone C, the first video tracking device 110 provides the object information stored in the memory to the second video tracking device 120 via a wired/wireless interface therebetween (step S208). Based on the object information provided from the first video tracking device 110, the second video tracking device 120 can track the object that has just moved into the surveillance zone B monitored by the second video tracking device 120.

On the other hand, if it is determined, in the step S206, that the object has not moved into the overlapped zone C, the first video tracking device 110 returns to the step 204 to update the object information stored in the memory.

The above-described embodiment suggested that the first video tracking device 110 provides object information to the second video tracking device 120 after monitoring the overlapped zone C (as in the first example) However, the second video tracking device 120 may also obtain object information by searching for object identification information associated with physical information extracted from an object moving into the surveillance zone B in a memory thereof and requesting, if the object identification information does not exist in the memory, the first video tracking device 110 to provide the object information associated with the physical information (as in the second example).

Further, though the object tracking system in this disclosure has only two video tracking devices 110 and 120 for an ease of explanation, it should be noted that the system may have three or more video tracking devices which operate as described in this disclosure.

While the invention has been shown and described with respect to the embodiment, it will be understood by those skilled in the art that various changes and modification may be made without departing from the scope of the invention as defined in the following claims.

What is claimed is:

1. An object tracking method using a system having an object identifying device and at least two video tracking devices, wherein the object identifying device monitors an area to identify an object entering the area and the video tracking device wired/wirelessly connected to the object identifying device monitors the area monitored by the object identifying device, the method comprising:
generating, at the object identifying device, object identification information from the object;
identifying, at the object identifying device and at one of the video tracking devices, an object entering an area monitored by the one of the at least two video tracking devices;
providing, by the object identifying device, the object identification information to the one video tracking device;
tracking, at the one video tracking device, the object to extract physical information of the object;
mapping, at the one video tracking device, the physical information to the object identification information to generate object information of the object; and
storing, at the one video tracking device, the object information in a memory of the one video tracking device; and
when the object enters an area monitored by a second, adjacent video tracking device, providing, by the one video tracking device, the stored object information to the adjacent video tracking device, wherein the one video tracking device and the adjacent video tracking device are sequentially aligned to monitor adjacent, partially overlapping areas.

2. The method of claim 1, further comprising:
determining, at each adjacent video tracking device, whether the object moves out from an area monitored thereby, and if it is determined that the object moves out from the area, providing the object information of the object to a video tracking device immediately next thereto monitoring an area into which the object moves; and
storing, at the video tracking device, the object information received from the immediately next video tracking device, in a memory thereof.

3. The method of claim 2, wherein each of the areas has at least one overlapped area monitored simultaneously by both adjacent video tracking devices, and, the object is determined to move out from the area if the object moves into the overlapped area.

4. The method of claim 2, further comprising:
tracking, at the video tracking device monitoring the area into which the object moves, the object to extract physical information of the object;
searching, at the video tracking device monitoring the area into which the object moves, for the object information corresponding to the physical information extracted thereby in the memory thereof; and
transmitting, at the video tracking device monitoring the area into which the object moves, to the video tracking device monitoring the area from which the object moves out a request signal to provide the object information corresponding to the physical information extracted thereby, if the object information corresponding to the physical information thereby does not exist in the memory thereof.

5. The method of claim 4, wherein the object is determined to move out from the area, if the video tracking device monitoring the area from which the object moves out receives the request signal from the video tracking device monitoring the area into which the object moves.

6. The method of claim 1, wherein the object identifying device identifies the object by at least one of receiving a certificate from the object, receiving an identification/password from the object, reading data from a radio-frequency identification tag attached to the object, reading data from a smart card attached to the object and detecting bio-signals of the object.

7. The method of claim 1, wherein the object identification information is object information selected from a group including a certificate of the object, an identification/password of the object, data read from a radio-frequency identification tag attached to the object, data read from a smart card attached to the object and bio-signals of the object.

8. The method of claim 7, wherein the object identification information is the object information onto which surveillance area information is mapped.

9. The method of claim 1, wherein the physical information is combination of visual information and movement information of the object, the visual information including at least one of color, size and appearance of the object and movement information including at least one of location, moving direction and velocity of the object.

10. An object tracking system, comprising:
an object identifying device for identifying an object entering an area monitored by the object identifying device and for generating object identification information of the object; and
at least two video tracking devices wired/wirelessly connected to the object identifying device for monitoring the area monitored by the object identifying device and for extracting physical information of the object,
wherein the object identifying device provides the object identification information to the at least two video tracking devices,
wherein each video tracking device maps the physical information to the object identification information to generate object information of the object and stores the object information in a memory thereof,
wherein the at least two video tracking devices are neighboring video tracking devices, sequentially aligned to monitor adjacent, partially overlapping areas, wherein when the object moves from one area monitored by one video tracking device to an adjacent area monitored by a neighboring video tracking device, the one video tracking device provides the respective stored object information to the neighboring video tracking device.

11. The system of claim 10:
  wherein the video tracking device determines whether the object moves out from an area monitored thereby, and if it is determined that the object moves out from the area, provides the object information of the object to the adjacent video tracking device monitoring an area into which the object moves; and
  wherein the adjacent video tracking device receives the object information from the video tracking device and stores the object information in a memory of the adjacent video tracking device.

12. The system of claim 11, wherein each of the areas has at least one overlapped area monitored simultaneously by both adjacent video tracking devices, and, the object is determined to move out from the area if the object moves into the overlapped area.

13. The system of claim 11, wherein the video tracking device monitoring the area into which the object moves tracks the object to extract physical information of the object, and, if the object information corresponding to the physical information extracted thereby does not exist in the memory thereof, transmits to the video tracking device monitoring the area from which the object moves out a request signal to provide the object information corresponding to the physical information extracted thereby.

14. The system of claim 13, wherein the object is determined to move out from the area, if the video tracking device monitoring the area from which the object moves out receives the request signal from the video tracking device monitoring the area into which the object moves.

15. The system of claim 10, wherein the object identifying device identifies the object by at least one of receiving a certificate from the object, receiving an identification/password from the object, reading data from a radio-frequency identification tag attached to the object, reading data from a smart card attached to the object and detecting bio-signals of the object.

16. The system of claim 10, wherein the object identification information is object information selected from a group including a certificate of the object, an identification/password of the object, data read from a radio-frequency identification tag attached to the object, data read from a smart card attached to the object and bio-signals of the object.

17. The system of claim 16, wherein the object identification information is the object information onto which surveillance area information is mapped.

18. The system of claim 10, wherein the physical information is combination of visual information and movement information of the object, the visual information including at least one of color, size and appearance of the object and movement information including at least one of location, moving direction and velocity of the object.

* * * * *